(12) United States Patent
Chakraborty et al.

(10) Patent No.: US 10,057,273 B1
(45) Date of Patent: Aug. 21, 2018

(54) SYSTEM AND METHOD FOR ENSURING PER TENANT MUTUAL EXCLUSION OF DATA AND ADMINISTRATIVE ENTITIES WITH LOW LATENCY AND HIGH SCALE

(71) Applicant: EMC Corporation, Hopkinton, MA (US)

(72) Inventors: Subhasish Chakraborty, Livermore, CA (US); Hongyu Zhang, San Jose, CA (US); Terry Hahn, Los Altos, CA (US); Xiaoyin Hu, Mountain View, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 85 days.

(21) Appl. No.: 15/085,908

(22) Filed: Mar. 30, 2016

(51) Int. Cl.
*G06F 7/04* (2006.01)
*H04L 29/06* (2006.01)
*H04L 29/12* (2006.01)
*H04L 12/743* (2013.01)

(52) U.S. Cl.
CPC ........ *H04L 63/105* (2013.01); *H04L 45/7453* (2013.01); *H04L 61/1552* (2013.01)

(58) Field of Classification Search
CPC ............... H04L 63/105; H04L 45/7453; H04L 61/1552
See application file for complete search history.

(56) References Cited

U.S. PATENT DOCUMENTS

| | | | |
|---|---|---|---|
| 8,612,696 B2 | 12/2013 | Zhu et al. | |
| 8,635,184 B2 | 1/2014 | Hsu et al. | |
| 9,294,507 B1 * | 3/2016 | Roth | H04L 63/20 |
| 9,396,341 B1 * | 7/2016 | Chandra | G06F 21/602 |
| 9,396,350 B1 * | 7/2016 | Feldman | G06F 9/465 |
| 9,430,490 B1 * | 8/2016 | Lewis | G06F 17/30156 |
| 2011/0302415 A1 * | 12/2011 | Ahmad | G06F 21/57 713/168 |
| 2012/0078948 A1 * | 3/2012 | Darcy | G06F 17/30197 707/769 |
| 2012/0166818 A1 * | 6/2012 | Orsini | H04L 9/085 713/193 |
| 2012/0260341 A1 * | 10/2012 | Chan | G06F 17/30477 726/23 |

(Continued)

FOREIGN PATENT DOCUMENTS

| | | | |
|---|---|---|---|
| KR | 20130085457 A | * | 7/2013 |
| WO | 2008008183 A3 | | 1/2008 |

*Primary Examiner* — Techane Gergiso
(74) *Attorney, Agent, or Firm* — Womble Bond Dickinson (US) LLP

(57) ABSTRACT

A request is received from a client device of a user for configuring a tenant of a multi-tenant storage system, the multi-tenant storage system storing data for different tenants. An entity identifier (ID) identifying an entity to be associated exclusively with the tenant is obtained from the request. A lookup operation is performed based on the entity in an SMT registry namespace cache stored in a memory to locate an entry that matches the entity. If no matching entry is found, the request is allowed. If a matching entry is found, a first tenant ID obtained from the request is compared with a second tenant ID stored in the matching entry. The request to configure the tenant is allowed if the first tenant ID matches the second tenant ID. The request is denied if the first tenant ID does not match the second tenant ID.

24 Claims, 7 Drawing Sheets

(56) References Cited

U.S. PATENT DOCUMENTS

| | | | |
|---|---|---|---|
| 2012/0281706 A1* | 11/2012 | Agarwal | H04L 67/1002 370/395.53 |
| 2014/0283010 A1* | 9/2014 | Rutkowski | G06F 21/31 726/18 |
| 2014/0317701 A1* | 10/2014 | Eicken | H04L 67/1097 726/5 |
| 2016/0154839 A1* | 6/2016 | Bezawada | G06F 17/30371 707/692 |
| 2017/0142068 A1* | 5/2017 | Devarajan | H04L 63/0254 |

* cited by examiner

| Entry ID | Entity Name | Entity Type | Entity Sub-Type | Tenant ID | Reference Count | Others |
|---|---|---|---|---|---|---|
| Hash 1 | John Doe | User | N/A | | | |
| Hash 2 | IP Address | Remote | IPv4 | | | |
| Hash 3 | Sales | User Group | N/A | | | |
| ⋮ 401 | ⋮ 402 | ⋮ 403 | ⋮ 404 | ⋮ 405 | ⋮ 406 | ⋮ 407 |

FIG. 4

SYSTEM AND METHOD FOR ENSURING PER TENANT MUTUAL EXCLUSION OF DATA AND ADMINISTRATIVE ENTITIES WITH LOW LATENCY AND HIGH SCALE

FIELD OF THE INVENTION

Embodiments of the present invention relate generally to multi-tenancy data storage systems. More particularly, embodiments of the invention relate to ensuring per tenant mutual exclusion of data and administrative entities of a multi-tenant storage system.

BACKGROUND

Multi-tenancy refers to a technology wherein a single storage appliance is deployed to serve multiple customers, each customer using the same storage appliance for their protection storage requirements. A storage system which supports multi-tenancy must satisfy the security and isolation requirements. Here, the "security and isolation requirements" refer to the requirements that each customer's dataset must be secured and isolated from the other customers on the storage appliance. The security and isolation requirements apply to data access. For example, a customer must not be able to read or write to datasets that belong to another customer. The security and isolation requirements can also refer to control access. For example, an administrator of one customer must not be able to perform system configuration, monitoring, etc., of the datasets that belong to another customer. Thus, although the customers may share the same storage appliance for backup, restore, or replicating their datasets, none of the customers can be aware of the presence of other customers in the storage appliance.

As storage appliances being deployed by storage service providers in multi-tenancy deployment, the same storage appliance may be used to store data of multiple tenants (e.g., customers). In such deployments, it is important to ensure that certain operating system entities (e.g., administrative and data entities) such as administrative local users, groups, data access users, administrative Internet protocol (IP) addresses, etc. are mutually exclusive per tenant, such that one tenant's users will not be able to view or modify another tenant's configuration and/or data.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of an SMT registry namespace cache according to one embodiment of the invention.

DETAILED DESCRIPTION

Figure 1:
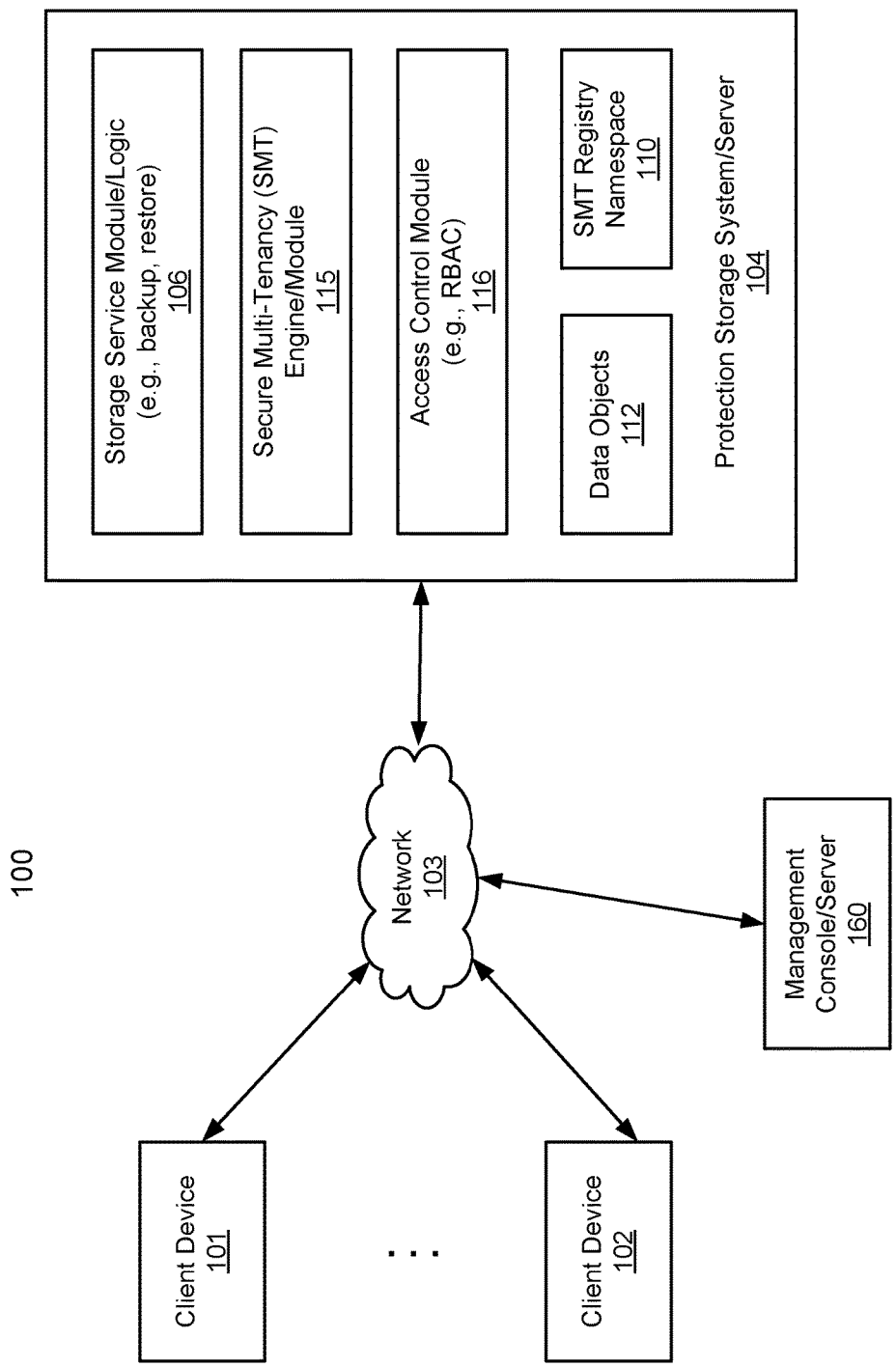
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a secure multi-tenancy (SMT) engine or module, which may be implemented in software, hardware, or a combination thereof, is utilized for multi-tenancy deployments of protection storage systems. The data stored in a multi-tenant protection storage system can be associated with one of many tenants and/or one of many tenant-units (TUs) of a particular tenant. Alternatively, data may be stored without being associated with any tenant or tenant-unit. A tenant-unit or tenant refers to an abstraction for multi-tenancy on a storage system having logically secured and isolated data and control paths, which may be file system objects, configuration for storage unit, a virtual tape library (VTL), etc. The SMT engine or module is responsible for authenticating and/or authorizing a particular user having a particular user role with respect to a protection storage system for the purpose of configuring the tenant-unit and/or tenant, for example, in an SMT registry namespace.

According to one embodiment, a request is received from a remote device of a user to configure a tenant of a storage system having many tenants configured therein. An SMT module is configured to extract or obtain an entity (e.g., a data management object or DMO such as a file system object or a file tree) that must be exclusively reserved for use by that tenant when the configuration is performed. The SMT module performs a lookup operation in an SMT registry namespace to locate an entry that matches or includes that entity. The SMT registry namespace has been at least partially cached in a system memory, referred to herein as SMT registry namespace cache or cached SMT registry namespace, where the SMT registry namespace is maintained and stored in a persistent storage device of the storage system, referred to herein as a persistent SMT registry namespace. In one embodiment, a hash is performed on one or more of the entity name, entity type, and entity sub-type of the entity using a predetermined hash function, generating a hash value. The lookup operation is performed based on the hash value in the cached SMT registry namespace, which may be indexed based on hash values. If no matching entry is found, the request for configuration is allowed. If a matching entry is found, the SMT module compares a first tenant ID identifying the tenant obtained from the request for which the configuration is requested with a second tenant ID obtained from the matching entry of the SMT registry namespace cache. If the first tenant ID matches the second tenant ID, the request for configuration is allowed; otherwise, the request is denied.

According to another embodiment, after the configuration operation has been performed on the requested tenant in the persistent SMT registry namespace, an update is performed on the cached SMT registry namespace to synchronize with the persistent SMT registry namespace. In one embodiment, each of the persistent SMT registry namespace and the cached SMT registry namespace maintains a version representing a version of the respective SMT registry namespace. When a configuration operation (also referred to as a data management operation) is performed on the persistent SMT registry namespace, a version number of the persistent SMT registry namespace is incremented. When there is a discrepancy between the version numbers of the persistent and cached tenant registries, an update is performed on the cached SMT registry namespace for synchronization. In one embodiment, when a configuration is performed, the SMT module determines whether the version numbers of the cached SMT registry namespace and the persistent SMT registry namespace are different. If so, an update of the cached SMT registry namespace is performed from the persistent SMT registry namespace. The cached SMT registry namespace is built when the storage system boots up and maintained throughout the operating session of the storage system with updates from the persistent SMT registry namespace, whenever a configuration affecting an entity that must be mutually exclusive per tenant is performed.

FIG. 1 is a block diagram illustrating a storage system according to one embodiment of the invention. Referring to FIG. 1, system 100 includes, but is not limited to, one or more client systems 101-102 communicatively coupled to protection storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as protection storage system 104. Network 103 may be any type of networks such as a local area network (LAN), a wide area network (WAN) such as the Internet, a fiber network, a storage network, or a combination thereof, wired or wireless.

Protection storage system 104 may include or represent any type of servers or a cluster of one or more servers (e.g., cloud servers). For example, protection storage system 104 may be a storage server used for various different purposes, such as to provide multiple users or client systems with access to shared data and/or to back up (or restore) data (e.g., mission critical data). Protection storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Protection storage system 104 may further provide storage services via an object-based protocol and Hadoop distributed file system (HDFS) protocol.

In one embodiment, protection storage system 104 includes, but is not limited to, storage service engine 106 (also referred to as service logic, service module, or service unit, which may be implemented in software, hardware, or a combination thereof) to provide storage services (e.g., backup, restore services) to data (e.g., data objects 112) stored in one or more storage units or devices (not shown). Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in a persistent storage device. The restore logic is configured to retrieve and restore backup data from a storage device back to a client (e.g., clients 101-102).

The storage units storing data 112 (not shown) may be implemented locally (e.g., single node operating environment) or remotely (e.g., multi-node operating environment) via interconnect, which may be a bus and/or a network (e.g., a storage network or a network similar to network 103). The storage units may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of the storage units may be located locally or remotely accessible over a network.

The data stored in server 104 may be deduplicated by deduplication logic or engine and stored in a form of deduplicated data segments. In response to a data file to be stored in the storage units, according to one embodiment, deduplication logic (not shown) is configured to segment the data file into multiple segments (also referred to as chunks) according to a variety of segmentation policies or rules. The deduplication logic may choose not to store a segment in a storage unit if the segment has been previously stored in the storage unit. In the event that the deduplication logic chooses not to store the segment in the storage unit, it stores metadata enabling the reconstruction of the file using the previously stored segment. As a result, segments of data files are stored in a deduplicated manner. The metadata may be stored in at least some of the storage units, such that files can be accessed independent of another storage unit. Metadata of each storage unit includes enough information to provide access to the files it contains.

In one embodiment, protection storage system 104 further includes a storage manager or storage controller (not shown) configured to manage storage resources of protection storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

According to one embodiment, protection storage system 104 further includes SMT module 115, access control module 116, and SMT registry namespace 110. SMT registry namespace 110 may be stored in a persistent storage device (e.g., hard disks) and implemented in a variety of data structures (e.g., tables, databases). SMT registry namespace 110 includes information defining, describing, and/or configuring each of tenants in a multi-tenancy storage system represented by server 104. A tenant refers to a hierarchical multi-tenancy object. Each tenant object includes information defining, describing, and/or configuring a corresponding tenant. Each tenant object may include or reference to one or more tenant-unit objects. Each of the tenant-unit objects represents a tenant-unit associated with the corresponding tenant. A tenant can have multiple tenant-units. However, no tenant-unit can be related to multiple tenants. A tenant may be an organization or enterprise entity, while a tenant-unit may be a division or business unit within an organization or enterprise entity. A tenant can exist across multiple storage systems, and each tenant is identified by a unique tenant identifier such as a universally unique identifier or UUID.

For example, a tenant object may include information defining DMOs associated with tenants and tenant-units, tenant-units associated with tenants, etc. Configuration operations that may be performed and that may change which DMOs are associated with which tenants and tenant-units include user assignment/un-assignment to/from a tenant-unit, group assignment/un-assignment to/from a tenant-unit, storage unit assignment/un-assignment to/from a tenant-unit, remote administrative IP address assignment/un-assignment to/from a tenant-unit, and tenant-unit addition and removal, etc.

In one embodiment, SMT module 115 is configured to provide security and isolation to each tenant. For example, SMT module 115 is configured to allocate tenant-units to tenants by managing various configuration metadata in SMT registry namespace 110. Access control module 116 may be a role-based access control (RBAC) module configured to use configuration metadata in the SMT registry namespace 110 and other registry namespaces to determine whether administrative users may perform management operations as set forth above on protection storage system 104. Note that SMT module 115 and access control module 116 may be implemented as a single module or engine. In this example as shown in FIG. 1, client devices 101-102 may be associated with the same or different tenants, same or different tenant-units of a particular tenant. Alternatively, client devices 101-102 may not be associated with any tenant or tenant-unit.

According to one embodiment, when a request is received from a remote device of a user to configure a tenant, SMT module 115 is configured to extract or obtain at least an entity ID identifying an entity of a particular tenant to be configured based on the request. An entity ID can be a combination of one or more of an entity name, entity type, and/or entity sub-type. SMT module 115 performs a lookup operation in a SMT registry namespace cache (not shown) to locate an entry that matches or includes at least the entity ID of the entity to be configured. The SMT registry namespace cache has been cached in a system memory from SMT registry namespace 110, referred to herein as SMT registry namespace cache or cached SMT registry namespace, where SMT registry namespace 110 is referred to herein as a persistent SMT registry namespace. In one embodiment, a hash is performed on at least one or more of the entity name, entity type, and entity sub-type using a predetermined hash function, generating a hash value. The lookup operation is performed based on the hash value in the cached SMT registry namespace, where the SMT registry namespace cache may be indexed based on hash values. If there is no matching entry found, the request for configuration will be allowed according to one embodiment. If a matching entry is found, SMT module 110 compares a first tenant ID identifying the requested tenant obtained from the request with a second tenant ID obtained from the matching entry of the SMT registry namespace cache. If the first tenant ID matches the second tenant ID, the request for configuration is allowed; otherwise, the request is denied.

Figure 2:
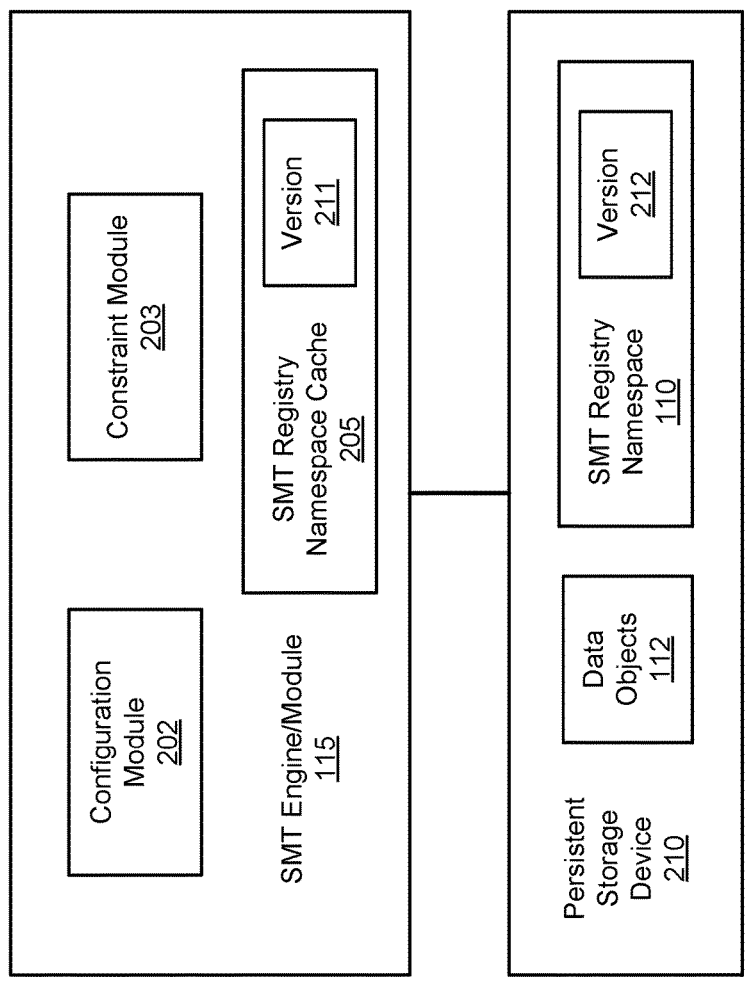
FIG. 2 is a block diagram illustrating an example of a secure multi-tenancy engine according to one embodiment of the invention.

FIG. 2 is a block diagram illustrating an example of a secure multi-tenancy engine according to one embodiment of the invention. Referring to FIG. 2, system 200 includes SMT engine/module 115, which may be implemented in software, hardware, or a combination thereof. In one embodiment, SMT module 115 includes, but is not limited to, configuration module 202, constraint module 203, and SMT registry namespace cache 205. SMT registry namespace cache 205 may be cached in a system memory from persistent SMT registry namespace 110 stored in persistent storage device 210. Persistent storage device 210 may be a variety of non-volatile storage devices such as hard disks.

In one embodiment, when configuration module 202 receives a request from a remote device of a user (e.g., client device 101 of FIG. 1) to perform a data management operation on an entity of a particular tenant (e.g., a file system object and/or a file tree collectively referred to as a data management object or DMO) stored in SMT registry namespace 110, configuration module 202 communicates with constraint module 203, for example, via an application programming interface (API) to determine whether the user is allowed to perform such a data management operation on the requested entity. The request may be received from the remote device via a configuration interface (not shown), which may be a Web interface, an API, a command line interface (CLI), or any other interfaces or communication protocols.

In one embodiment, at least an entity ID identifying an entity on which a data management operation to be performed may be obtained from the request and used as a key to look up in SMT registry namespace cache 205 by constraint module 203 to determine whether the requested management operation is allowed. Note that at this point, it is assumed the user has been properly authenticated and authorized to perform the operation, for example, based on its username and password, role based access control checks, etc. Although the user has been authenticated and authorized, the user may or may not be allowed to perform a data management operation on a particular entity. Specifically, if the operation would result in the same entity being associated with two different tenants, then the operation is not allowed. Otherwise the operation is allowed.

In one embodiment, SMT registry namespace cache 205 includes multiple entries, each entry storing a variety of metadata describing a tenant or a tenant-unit of a tenant. Based on at least the entity ID, an entry of SMT registry namespace cache is located. In one embodiment, an entity ID may be represented by a combination of one or more of an entity name, entity type, and entity sub-type. In one embodiment, constraint module 203 hashes, using a predetermined hash function or hash algorithm, at least one or more of the entity name, entity type, and entity subtype, to generate a hash value. Constraint module 203 then performs the lookup in SMT registry namespace 205 based on the hash value. The entries of SMT registry namespace cache 205 may be indexed based on hash values.

In one embodiment, if there is no matching entry found, the requested operation is then allowed. The rationale behind it is that if a matching entry is not found, the entity in the operation is not associated with any tenant. Thus, the data management operation can be performed, and thereafter the entity is associated with the tenant ID of the data management operation request. If a matching entry has been located, constraint module 203 compares a first tenant ID obtained from the request with a second tenant ID obtained from the matching entry. If the first and second tenant IDs match, the user may be allowed to perform the requested data management operation; otherwise, the data management operation is denied. Configuration module 202 then performs the requested data management operation on SMT registry namespace 110. An example of a data management operation includes associating/assigning or disassociating/removing a data management object (e.g., a file system object, a file tree, a storage resource, a user, a user group) to/from a tenant-unit or a tenant. The data management operation performed by configuration module 202 may cause changes in SMT registry namespace 110.

In one embodiment, SMT registry namespace cache 205 may be constructed from persistent SMT registry namespace 110 and loaded into the memory during an initialization of system 200 (e.g., boot time). SMT registry namespace cache 205 may be updated from persistent SMT registry namespace 110. For example, when a data management operation is performed on SMT registry namespace 110, SMT registry namespace cache 205 may be subsequently updated. In one embodiment, after a data management operation has been performed on SMT registry namespace 110, version number 212 (also referred to as a persistent version number) is updated, e.g., incremented. Similarly, SMT registry namespace cache 205 also includes version number 211 (also referred to as a cache version number). When there is a discrepancy between version numbers 211-212, SMT registry namespace cache 205 may be rebuilt or synchronized from persistent SMT registry namespace 110, upon which version number 211 may also be updated accordingly (e.g., incremented).

In one embodiment, when persistent SMT registry namespace 110 has been changed, SMT registry namespace cache 205 may be updated immediately (e.g., within the same process or thread). In such a scenario, version number 212 and version number 211 may not need to change. Version number 212 is updated only if the update to SMT registry namespace cache 205 cannot be immediately performed and thus, there may be a race condition between the two when a new request is received. In other words, version number 212 is incremented only when the process changing the configuration does not have access to SMT registry namespace cache 205 and must determine without SMT registry namespace cache 205 whether the change is allowed based on at most reading the registry information from persistent SMT registry namespace 110. In this case, if the configuration change will not cause the same entity to be associated with more than one tenant, the process is allowed to perform the configuration change and increment version number 212. Examples of operations that will not cause the same entity to be associated with more than one tenant include deleting a DMO from the protection storage system, and operations that result in adding an additional DMO association to a tenant-unit after reading persistent SMT registry namespace 110 to determine that the DMO is already associated with the tenant-unit.

Note that a process modifying persistent SMT registry namespace 110 may not have access to SMT registry namespace cache 205 at the time of the modification if the memory in which SMT registry namespace cache 205 resides is not attached to the process. The cache may be resident only in the memory of a single process that performs almost all of the configuration operations. In such situation, version number 212 is incremented to indicate that now persistent SMT registry namespace 110 is newer than SMT registry namespace cache 205.

According to one embodiment, every time when constraint module 203 receives a request from configuration module 202 to access information stored in SMT registry namespace cache 205, constraint module 203 examines version number 211 in view of version number 212. If version numbers 211-212 do not match, SMT registry namespace cache 205 may be updated from SMT registry namespace 110, prior to processing the request received from configuration module 202.

Figure 3:
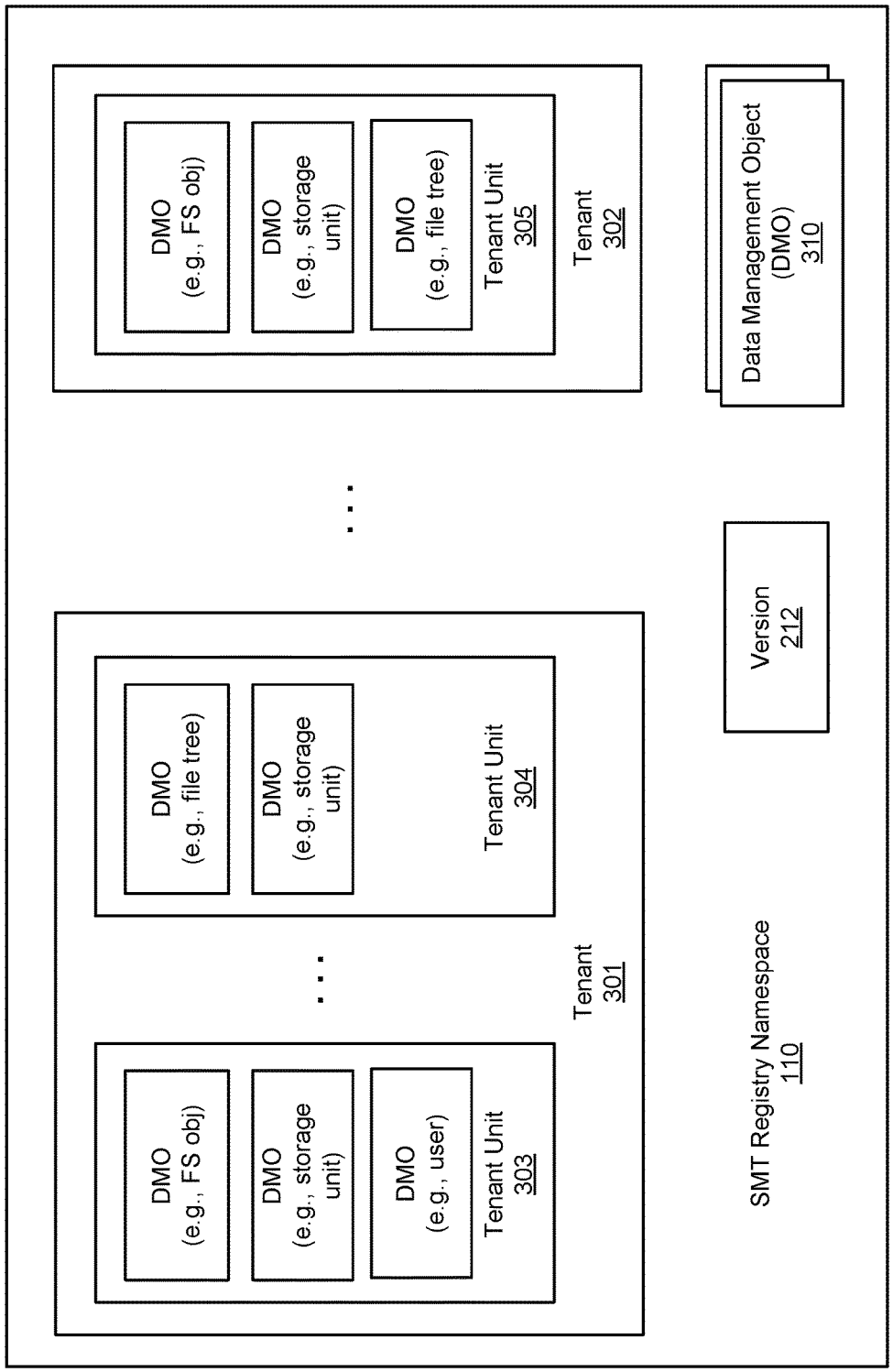
FIG. 3 is a block diagram illustrating an example of an SMT registry namespace according to one embodiment of the invention.

FIG. 3 is a block diagram illustrating an example of an SMT registry namespace according to one embodiment of the invention. Referring to FIG. 3, in this example, SMT registry namespace 110 includes multiple tenants 301-302. Each of tenants 301-302 may include one or more tenant-units. In this example, tenant 301 includes tenant-units 301-302, while tenant 302 include tenant-unit 305. Each of tenant-units 303-305 may include one or more data management objects (DMOs) representing storage resources associated with the tenant-unit. A data management object can be a file system management object having directory information of a directory of one or more files. A data management object can describe one or more storage units or resources assigned to a tenant-unit. A data management object can be a user object having information describing a user or a user role of the user associated with a particular tenant-unit or tenant. As described above, some data management objects such as data management objects 310 may not be associated with any tenant-unit or any tenant. Some data management objects may be associated with a tenant-unit, but not associated with a tenant. A data management operation described above may create, remove, or modify any of the data management objects, which may cause version number 212 to be incremented. The incremented version number 212 may cause an update to SMT registry namespace cache 205.

FIG. 4 is a block diagram illustrating an example of an SMT registry namespace cache according to one embodiment of the invention. Referring to FIG. 4, SMT registry namespace cache 205 may be built and/or updated from SMT registry namespace 110 of FIG. 3. Note that in this example, although SMT registry namespace cache 205 has been shown in a mapping table, however, it can also be implemented in a variety of data structures (e.g., databases). In one embodiment, SMT registry namespace cache 205 includes multiple entries, each entry includes entry ID (in this example, in a form of hash values) 401, administrative or data entity name or ID 402, administrative or data entity type 403, administrative or data entity subtype 404, tenant ID (e.g., UUID) 405, reference count 406, and other information 407.

In one embodiment, entry ID 401 may be generated by hashing one or more of attributes 402-404. An entity can be any kind of entities, such as, for example, a user, an IP address, a user group, etc. For example, if an entity is a user, entity name 402 includes the name of the user, in this example, John Doe. Entity type 403 will indicates that the type of the entity is a user. If an entity is an IP address, entity name 402 includes the actual IP address. Entity type 403 will indicate the corresponding entity is an IP address and entity sub-type 404 may indicate the type of the IP address (e.g., IPv4 or IPv6). If an entity is a user group, entity name 402 will include the actual user group name (e.g., sales department) and entity type will indicates the corresponding entity is a user group. Hashing and matching one or more of attributes 402-404 will significantly improve the lookup and matching efficiency.

Reference count 406 represents the number of times a data management object is currently associated with a tenant identified by tenant ID 405. Reference count 406 can be incremented or decremented dependent upon the specific data management operation. For example, if a data management operation is to add another data management object (e.g., add another storage unit to a tenant-unit), the version number in the persistent SMT registry namespace 110 will be incremented, which triggers an update in SMT registry namespace cache 205. As a result, SMT registry namespace cache 205 is updated, including incrementing reference count 406. Similarly, if a data management operation is to remove a data management object from the tenant-unit (e.g., removing a storage unit), reference count 406 will be decremented. In one embodiment, when reference count 406 reaches zero, the corresponding cache entry may be removed from SMT registry namespace cache 205.

Figure 5:
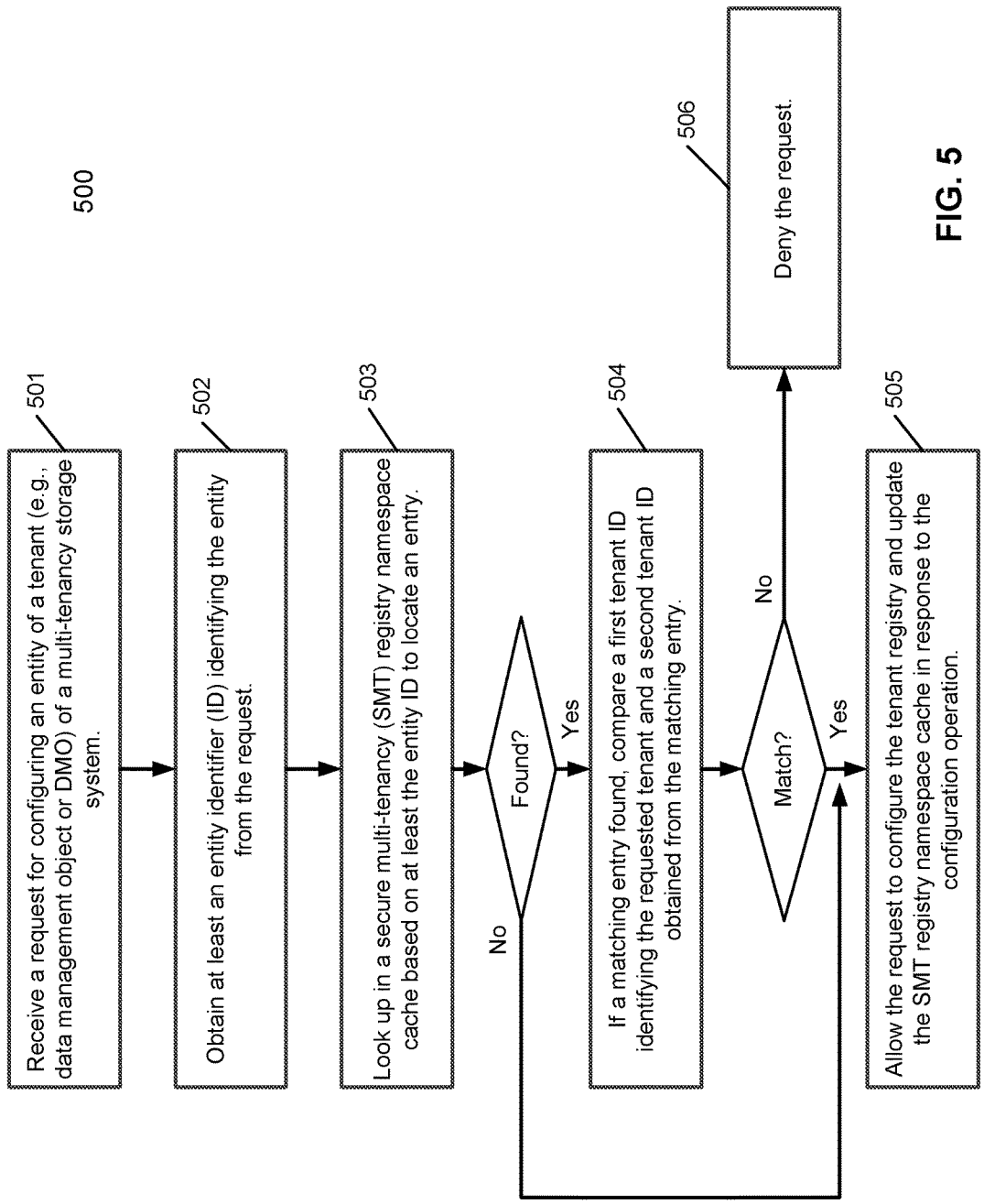
FIG. 5 is a flow diagram illustrating a process of allowing a configuration operation for configuring an SMT registry namespace according to one embodiment of the invention.

FIG. 5 is a flow diagram illustrating a process of allowing a configuration operation for configuring an SMT registry namespace according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by system 200 of FIG. 2. Referring to FIG. 5, at block 501, processing logic receives a request from a user device of a user for configuring a tenant of a multi-tenancy storage system. At block 502, processing logic extracts an entity ID identifying an entity to be accessed from the request. An entity ID may be represented by a combination of one or more of an entity name, entity type, and entity sub-type. At block 503, processing logic looks up in an SMT registry namespace cache to locate an entry matching at least the entity ID. In one embodiment, processing logic computes a hash using a predetermined hash function or algorithm on the entity ID to generate a hash value. The hash value is used as a key to perform the lookup operation, where entries of the SMT registry namespace cache may be indexed based on hash values of the entries.

In one embodiment, if there is no matching entry found in the SMT registry namespace cache, the request is allowed at block 505. If a matching entry is found, at block 504, processing logic compares a first tenant ID obtained from the request with a second tenant ID obtained from the matching entry. If the first tenant ID matches the second tenant ID, at block 505, the request is allowed to configure the corresponding tenant-unit in a persistent SMT registry namespace and an update may be performed on the SMT registry namespace cache in view of the configuration operation on the persistent SMT registry namespace. If the first tenant ID does not match the second tenant ID, at block 506, the request is denied.

Figure 6:
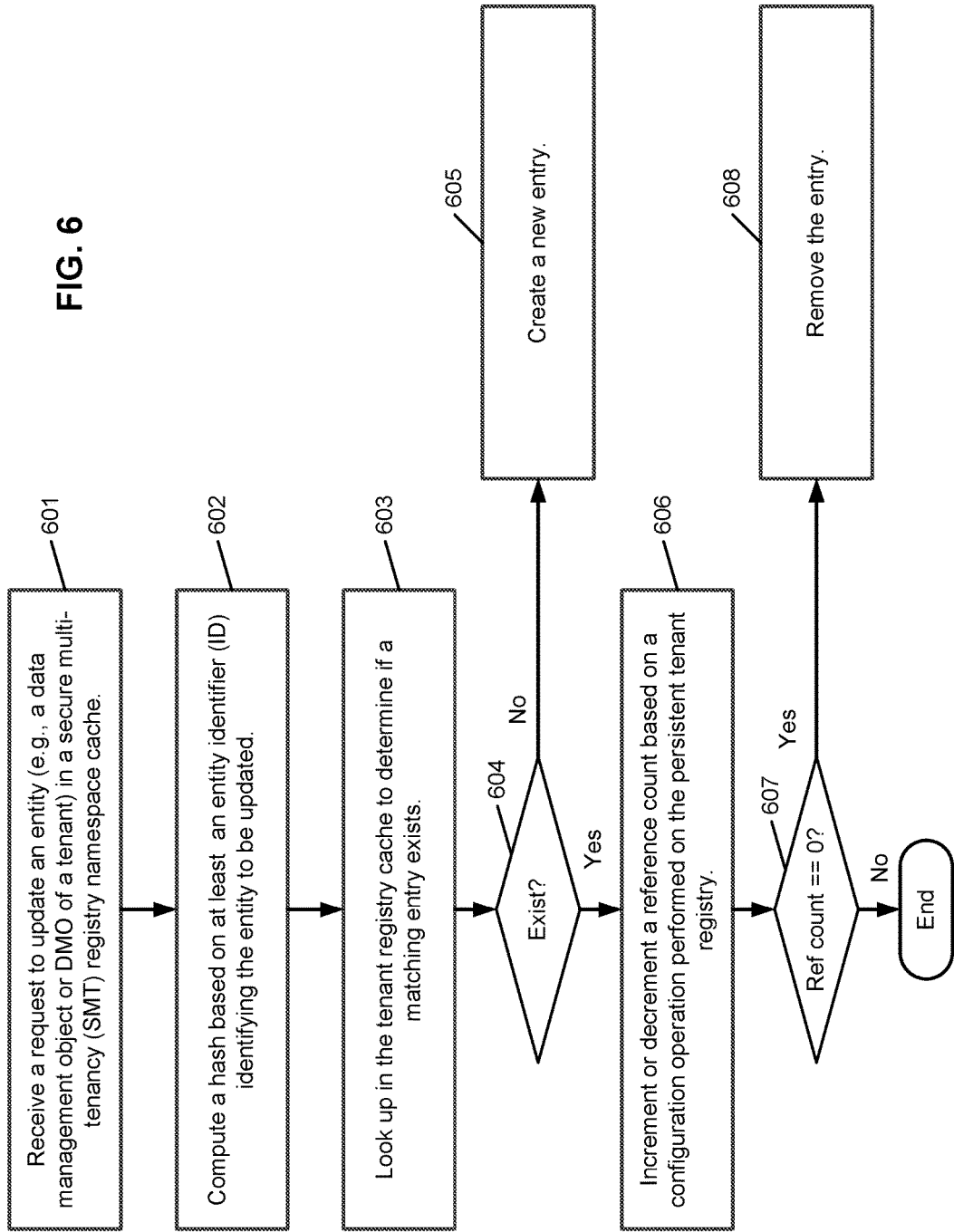
FIG. 6 is a flow diagram illustrating a process for updating an SMT registry namespace cache according to one embodiment of the invention.

FIG. 6 is a flow diagram illustrating a process for updating an SMT registry namespace cache according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by system 200 of FIG. 2. Referring to FIG. 6, at block 601, processing logic receives a request to update a tenant-unit of a tenant in an SMT registry namespace cache. At block 602, processing logic computes a hash, using a predetermined hash function or algorithm, on at least an entity ID (which may be represented by one or more of an entity name, entity type, and entity sub-type), generating a hash value. At block 603, processing looks up in an SMT registry namespace cache based on the hash value to locate an entry matching the hash value. If it is determined at block 604 that there is no matching entry found, a new entry is created at block 605. At block 606, a reference count of the matching or new entry is incremented or decremented dependent upon the type of the data management operation (e.g., adding or deleting a data management object). If the reference count reaches a predetermined threshold, i.e., zero at block 607, the entry may be removed from the SMT registry namespace cache at block 608.

Note that some or all of the components as shown and described above (e.g., SMT engine or module 115) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
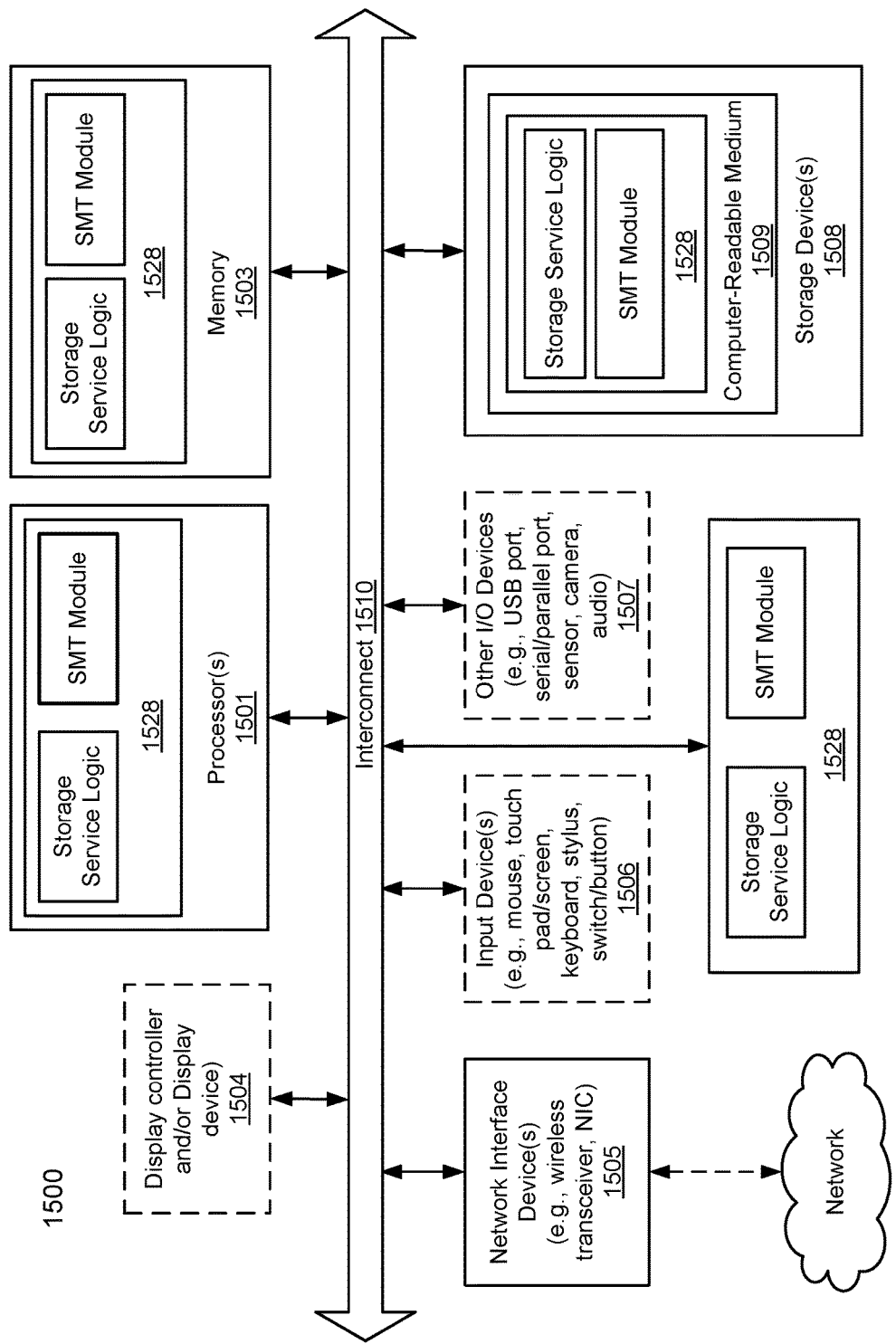
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for configuring a multi-tenant storage system, the method comprising:
   receiving a request from a client device of a user for configuring a tenant of a multi-tenant storage system, the multi-tenant storage system storing data for a plurality of tenants;
   extracting from the request, by a secure multi-tenant (SMT) module executed by a processor, an entity identifier (ID) identifying an entity associated with the tenant by the request;
   performing by the SMT module a lookup operation based on an entity name, an entity type, and an entity sub-type of the entity in an SMT registry namespace cache stored in a memory to locate an entry that matches the entity ID, including
      hashing the entity name, the entity type, and the entity sub-type of the entity identified by the entity ID to generating a hash value, and
      performing the lookup operation in the SMT registry namespace cache based on the hash value to locate an entry that matches the hash value, wherein entries of the SMT registry namespace cache is indexed based on hash values;
   determining whether there is an entry in the SMT registry namespace cache that matches the hash value;
   allowing the request for configuring the tenant in response to determining that there is no entry that matches the hash value;
   if there is a matching entry, comparing by the SMT module a first tenant ID obtained from the request and a second tenant ID stored in the matching entry;
   allowing the request in response to determining that the first tenant ID matches the second tenant ID;
   denying the request if the first tenant ID does not match the second tenant ID;

receiving a signal indicating that the configuration operation has been completed on the requested tenant stored in a persistent SMT registry namespace stored in a persistent device; and updating the SMT registry namespace cache stored in the memory from the persistent SMT registry namespace in response to the signal.

2. The method of claim 1, wherein updating the SMT registry namespace cache stored in the memory from the persistent SMT registry namespace comprises:

incrementing or decrementing a reference count in the matching entry based on a type of a configuration operation that has been performed.

3. The method of claim 1, further comprising incrementing a version number of the persistent SMT registry namespace in response to the signal, wherein the incremented version number causes the SMT registry namespace cache to be updated from a persistent SMT registry namespace stored in a persistent storage device.

4. The method of claim 1, wherein the SMT registry namespace cache includes a plurality of entries corresponding to a plurality of tenants of the multi-tenant storage system, and wherein the SMT registry namespace cache was located into the memory from a persistent storage system that stores a persistent SMT registry namespace.

5. A computer-implemented method for configuring a multi-tenant storage system, the method comprising:

receiving a request from a client device of a user for configuring a tenant of a multi-tenant storage system, the multi-tenant storage system storing data for a plurality of tenants;

extracting from the request, by a secure multi-tenant (SMT) module executed by a processor, an entity identifier (ID) identifying an entity associated with the tenant by the request;

determining whether a first version number associated with an SMT registry namespace cache stored in a memory matches a second version number associated with a persistent SMT registry namespace stored in a persistent storage device, wherein the SMT registry namespace cache includes a plurality of entries corresponding to a plurality of tenants of the multi-tenant storage system, and wherein the SMT registry namespace cache was located into the memory from the persistent storage system that stores the persistent SMT registry namespace;

updating the SMT registry namespace cache in the memory from the persistent SMT registry namespace, in response to determining that the first and second version numbers do not match;

performing by the SMT module a lookup operation based on an entity name, an entity type, and an entity sub-type of the entity in the SMT registry namespace cache stored in the memory to locate an entry that matches the entity ID, including hashing the entity name, the entity type, and the entity sub-type of the entity identified by the entity ID to generating a hash value, and performing the lookup operation in the SMT registry namespace cache based on the hash value to locate an entry that matches the hash value;

comparing by the SMT module a first tenant ID obtained from the request and a second tenant ID stored in the matching entry; and denying the request if the first tenant ID does not match the second tenant ID.

6. The method of claim 5, wherein entries of the SMT registry namespace cache is indexed based on hash values.

7. The method of claim 6, further comprising:

determining whether there is an entry in the SMT registry namespace cache that matches the hash value;

allowing the request for configuring the tenant in response to determining that there is no entry that matches the hash value; and allowing the request in response to determining that the first tenant ID matches the second tenant ID.

8. The method of claim 7, further comprising:

receiving a signal indicating that the configuration operation has been completed on the requested tenant stored in a persistent SMT registry namespace stored in a persistent device; and updating the SMT registry namespace cache stored in the memory from the persistent SMT registry namespace in response to the signal.

9. A non-transitory machine-readable medium having instructions stored therein, which when executed by a processor, cause the processor to perform operations of configuring tenants of a multi-tenant storage system, the operations comprising:

receiving a request from a client device of a user for configuring a tenant of a multi-tenant storage system, the multi-tenant storage system storing data for a plurality of tenants;

extracting from the request, by a secure multi-tenant (SMT) module executed by a processor, an entity identifier (ID) identifying an entity associated with the tenant by the request;

performing by the SMT module a lookup operation based on an entity name, an entity type, and an entity sub-type of the entity in an SMT registry namespace cache stored in a memory to locate an entry that matches the entity ID, including hashing the entity name, the entity type, and the entity sub-type of the entity identified by the entity ID to generating a hash value, and performing the lookup operation in the SMT registry namespace cache based on the hash value to locate an entry that matches the hash value, wherein entries of the SMT registry namespace cache is indexed based on hash values;

determining whether there is an entry in the SMT registry namespace cache that matches the hash value;

allowing the request for configuring the tenant in response to determining that there is no entry that matches the hash value;

if there is a matching entry, comparing by the SMT module a first tenant ID obtained from the request and a second tenant ID stored in the matching entry;

allowing the request in response to determining that the first tenant ID matches the second tenant ID;

denying the request if the first tenant ID does not match the second tenant ID;

receiving a signal indicating that the configuration operation has been completed on the requested tenant stored in a persistent SMT registry namespace stored in a persistent device; and updating the SMT registry namespace cache stored in the memo from the persistent SMT registry namespace in response to the signal.

10. The non-transitory machine-readable medium of claim 9, wherein updating the SMT registry namespace cache stored in the memory from the persistent SMT registry namespace comprises:

incrementing or decrementing a reference count in the matching entry based on a type of a configuration operation that has been performed.

11. The non-transitory machine-readable medium of claim 9, wherein the operations further comprise incrementing a version number of the persistent SMT registry namespace in response to the signal, wherein the incremented version number causes the SMT registry namespace cache to be updated from a persistent SMT registry namespace stored in a persistent storage device.

12. The non-transitory machine-readable medium of claim 9, wherein the SMT registry namespace cache includes a plurality of entries corresponding to a plurality of tenants of the multi-tenant storage system, and wherein the SMT registry namespace cache was located into the memory from a persistent storage system that stores a persistent SMT registry namespace.

13. A non-transitory machine-readable medium having instructions stored therein, which when executed by a processor, cause the processor to perform operations of configuring tenants of a multi-tenant storage system, the operations comprising:
   receiving a request from a client device of a user for configuring a tenant of a multi-tenant storage system, the multi-tenant storage system storing data for a plurality of tenants;
   extracting from the request, by a secure multi-tenant (SMT) module executed by a processor, an entity identifier (ID) identifying an entity associated with the tenant by the request;
   determining whether a first version number associated with an SMT registry namespace cache stored in a memory matches a second version number associated with a persistent SMT registry namespace stored in the persistent storage device, wherein the SMT registry namespace cache includes a plurality of entries corresponding to a plurality of tenants of the multi-tenant storage system, and wherein the SMT registry namespace cache was located into the memory from the persistent storage system that stores the persistent SMT registry namespace;
   updating the SMT registry namespace cache in the memory from the persistent SMT registry namespace, in response to determining that the first and second version numbers do not match;
   performing by the SMT module a lookup operation based on an entity name, an entity type, and an entity sub-type of the entity in the SMT registry namespace cache stored in the memory to locate an entry that matches the entity ID, including
      hashing the entity name, the entity type, and the entity sub-type of the entity identified by the entity ID to generating a hash value, and
      performing the lookup operation in the SMT registry namespace cache based on the hash value to locate an entry that matches the hash value;
   comparing by the SMT module a first tenant ID obtained from the request and a second tenant ID stored in the matching entry; and
   denying the request if the first tenant ID does not match the second tenant ID.

14. The non-transitory machine-readable medium of claim 13, wherein entries of the SMT registry namespace cache is indexed based on hash values.

15. The non-transitory machine-readable medium of claim 14, wherein the operations further comprise:

determining whether there is an entry in the SMT registry namespace cache that matches the hash value;
allowing the request for configuring the tenant in response to determining that there is no entry that matches the hash value; and
allowing the request in response to determining that the first tenant ID matches the second tenant ID.

16. The non-transitory machine-readable medium of claim 15, wherein the operations further comprise:
   receiving a signal indicating that the configuration operation has been completed on the requested tenant stored in a persistent SMT registry namespace stored in a persistent device; and
   updating the SMT registry namespace cache stored in the memory from the persistent SMT registry namespace in response to the signal.

17. A data processing system, comprising:
   a processor;
   a memory coupled to the processor;
   a secure multi-tenancy (SMT) module coupled to the processor and memory to perform operations, the operations including
      receiving a request from a client device of a user for configuring a tenant of a multi-tenant storage system, the multi-tenant storage system storing data for a plurality of tenants;
      extracting from the request, by a secure multi-tenant (SMT) module executed by a processor, an entity identifier (ID) identifying an entity associated with the tenant by the request;
      performing by the SMT module a lookup operation based on an entity name, an entity type, and an entity sub-type of the entity in an SMT registry namespace cache stored in a memory to locate an entry that matches the entity ID, including
         hashing the entity name, the entity type, and the entity sub-type of the entity identified by the entity ID to generating a hash value, and
         performing the lookup operation in the SMT registry namespace cache based on the hash value to locate an entry that matches the hash value, wherein entries of the SMT registry namespace cache is indexed based on hash values;
      determining whether there is an entry in the SMT registry namespace cache that matches the hash value;
      allowing the request for configuring the tenant in response to determining that there is no entry that matches the hash value;
      if there is a matching entry, comparing by the SMT module a first tenant ID obtained from the request and a second tenant ID stored in the matching entry;
      allowing the request in response to determining that the first tenant ID matches the second tenant ID;
      denying the request if the first tenant ID does not match the second tenant ID;
      receiving a signal indicating that the configuration operation has been completed on the requested tenant stored in a persistent SMT registry namespace stored in a persistent device; and
      updating the SMT registry namespace cache stored in the memory from the persistent SMT registry namespace in response to the signal.

18. The system of claim 17, wherein updating the SMT registry namespace cache stored in the memory from the persistent SMT registry namespace comprises:

incrementing or decrementing a reference count in the matching entry based on a type of a configuration operation that has been performed.

19. The system of claim 17, wherein the operations further comprise incrementing a version number of the persistent SMT registry namespace in response to the signal, wherein the incremented version number causes the SMT registry namespace cache to be updated from a persistent SMT registry namespace stored in a persistent storage device.

20. The system of claim 17, wherein the SMT registry namespace cache includes a plurality of entries corresponding to a plurality of tenants of the multi-tenant storage system, and wherein the SMT registry namespace cache was located into the memory from a persistent storage system that stores a persistent SMT registry namespace.

21. A data processing system, comprising:
  a processor;
  a memory coupled to the processor; and
  a secure multi-tenancy (SMT) module coupled to the processor and memory to perform operations, the operations including
    receiving a request from a client device of a user for configuring a tenant of a multi-tenant storage system, the multi-tenant storage system storing data for a plurality of tenants;
    extracting from the request, by a secure multi-tenant (SMT) module executed by a processor, an entity identifier (ID) identifying an entity associated with the tenant by the request;
    determining whether a first version number associated with an SMT registry namespace cache stored in a memory matches a second version number associated with a persistent SMT registry namespace stored in the persistent storage device, wherein the SMT registry namespace cache includes a plurality of entries corresponding to a plurality of tenants of the multi-tenant storage system, and wherein the SMT registry namespace cache was located into the memory from the persistent storage system that stores the persistent SMT registry namespace;
    updating the SMT registry namespace cache in the memory from the persistent SMT registry namespace, in response to determining that the first and second version numbers do not match;
    performing by the SMT module a lookup operation based on an entity name, an entity type, and an entity sub-type of the entity in the SMT registry namespace cache stored in the memory to locate an entry that matches the entity ID, including
      hashing the entity name, the entity type, and the entity sub-type of the entity identified by the entity ID to generating a hash value, and
      performing the lookup operation in the SMT registry namespace cache based on the hash value to locate an entry that matches the hash value;
    comparing by the SMT module a first tenant ID obtained from the request and a second tenant ID stored in the matching entry; and
    denying the request if the first tenant ID does not match the second tenant ID.

22. The system of claim 21, wherein entries of the SMT registry namespace cache is indexed based on hash values.

23. The system of claim 22, wherein the operations further comprise:
  determining whether there is an entry in the SMT registry namespace cache that matches the hash value;
  allowing the request for configuring the tenant in response to determining that there is no entry that matches the hash value; and
  allowing the request in response to determining that the first tenant ID matches the second tenant ID.

24. The system of claim 23, wherein the operations further comprise:
  receiving a signal indicating that the configuration operation has been completed on the requested tenant stored in a persistent SMT registry namespace stored in a persistent device; and
  updating the SMT registry namespace cache stored in the memory from the persistent SMT registry namespace in response to the signal.

* * * * *